United States Patent
Tinnakornsrisuphap et al.

(10) Patent No.: US 9,924,443 B2
(45) Date of Patent: Mar. 20, 2018

(54) METHODS AND APPARATUS FOR SELECTING FEMTOCELL ACCESS MODES AND OPERATIONAL PARAMETERS BASED ON THE PRESENCE OF NEARBY MACROCELLS

(71) Applicant: QUALCOMM Incorporated, San Diego, CA (US)

(72) Inventors: Peerapol Tinnakornsrisuphap, San Diego, CA (US); Damanjit Singh, San Diego, CA (US); Mehmet Yavuz, San Diego, CA (US); Yeliz Tokgoz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 113 days.

(21) Appl. No.: 13/773,401

(22) Filed: Feb. 21, 2013

(65) Prior Publication Data
US 2013/0225195 A1 Aug. 29, 2013

Related U.S. Application Data

(60) Provisional application No. 61/602,989, filed on Feb. 24, 2012.

(51) Int. Cl.
*H04W 72/00* (2009.01)
*H04W 48/06* (2009.01)
*H04W 24/02* (2009.01)
*H04W 84/04* (2009.01)

(52) U.S. Cl.
CPC ........... *H04W 48/06* (2013.01); *H04W 24/02* (2013.01); *H04W 84/045* (2013.01)

(58) Field of Classification Search
CPC .... H04W 48/06; H04W 84/045; H04W 24/02
USPC ......................................................... 455/453
See application file for complete search history.

(56) References Cited

U.S. PATENT DOCUMENTS

| | | | |
|---|---|---|---|
| 9,258,751 B2* | 2/2016 | Sander | |
| 2002/0147008 A1* | 10/2002 | Kallio | H04W 36/14 455/426.1 |
| 2003/0096620 A1* | 5/2003 | Ozturk | H04W 64/00 455/456.1 |

(Continued)

FOREIGN PATENT DOCUMENTS

| CN | 101998545 A | 3/2011 |
|---|---|---|
| EP | 2326118 A1 | 5/2011 |

(Continued)

OTHER PUBLICATIONS

International Search Report and Written Opinion—PCT/US2013/027518—ISA/EPO—Jun. 10, 2013.

(Continued)

*Primary Examiner* — Steve D'Agosta
(74) *Attorney, Agent, or Firm* — Arent Fox, LLP

(57) ABSTRACT

Methods and apparatus are disclosed for configuring an access mode of a femtocell. The method includes determining whether a target channel is being used by a macrocell. The method includes, in response to the target channel being used by the macrocell, configuring the access mode to a closed access mode. The method includes in response to the target channel not being used by the macrocell, configuring the access mode to an open or hybrid access mode.

28 Claims, 11 Drawing Sheets

(56) References Cited

U.S. PATENT DOCUMENTS

| | | | | |
|---|---|---|---|---|
| 2007/0097983 | A1* | 5/2007 | Nylander | H04L 61/1511 370/395.2 |
| 2009/0068970 | A1* | 3/2009 | Ahmed | H04W 48/16 455/161.1 |
| 2009/0104905 | A1* | 4/2009 | DiGirolamo | H04J 11/0093 455/434 |
| 2009/0156213 | A1* | 6/2009 | Spinelli | H04W 92/02 455/436 |
| 2009/0170440 | A1* | 7/2009 | Eyuboglu | H04W 36/06 455/63.3 |
| 2009/0196253 | A1* | 8/2009 | Semper | H04W 24/02 370/331 |
| 2009/0270111 | A1* | 10/2009 | Nakamura | H04W 60/00 455/456.1 |
| 2009/0280819 | A1* | 11/2009 | Brisebois | H04W 52/244 455/446 |
| 2010/0118827 | A1* | 5/2010 | Sundaresan et al. | 370/330 |
| 2010/0118844 | A1* | 5/2010 | Jiao | H04W 24/02 370/338 |
| 2010/0136943 | A1* | 6/2010 | Hirvela | H04W 4/00 455/404.1 |
| 2010/0144338 | A1 | 6/2010 | Kim et al. | |
| 2010/0289640 | A1* | 11/2010 | Annamalai | H04W 4/02 340/539.13 |
| 2010/0304745 | A1* | 12/2010 | Patel | H04W 52/143 455/435.1 |
| 2011/0021205 | A1* | 1/2011 | Horneman | H04W 24/02 455/450 |
| 2011/0053609 | A1* | 3/2011 | Choi-Grogan | H04W 64/00 455/456.2 |
| 2011/0125510 | A1* | 5/2011 | Ho | 705/1.1 |
| 2011/0143737 | A1* | 6/2011 | Kim et al. | 455/418 |
| 2011/0143763 | A1 | 6/2011 | Kim | |
| 2011/0151886 | A1* | 6/2011 | Grayson | H04W 16/04 455/452.1 |
| 2011/0212744 | A1* | 9/2011 | Katayama | H04W 52/143 455/522 |
| 2011/0244870 | A1 | 10/2011 | Lee | |
| 2012/0142364 | A1 | 6/2012 | Duan | |
| 2012/0165005 | A1* | 6/2012 | Brend | H04W 52/243 455/422.1 |
| 2012/0252521 | A1 | 10/2012 | Nagaraja et al. | |
| 2013/0130679 | A1* | 5/2013 | Naka et al. | 455/433 |
| 2013/0265901 | A1* | 10/2013 | Pedersen et al. | 370/252 |

FOREIGN PATENT DOCUMENTS

| | | | | |
|---|---|---|---|---|
| JP | WO 2010058847 | A1 * | 5/2010 | H04W 12/06 |
| JP | 2011061614 | A | 3/2011 | |
| WO | WO-2009006041 | A1 | 1/2009 | |

OTHER PUBLICATIONS

Mahmoud, A.H., et al., "A comparative study of different deployment modes for femtocell networks", IEEE 20th International Symposium on Personal, Indoor and Mobile Radio Communications (PIMRC 2009), IEEE, Piscataway, NJ, USA, Sep. 13, 2009 (Sep. 13, 2009), pp. 1-5, XP031659738, ISBN: 978-1-4244-5122-7.

Motorola: "Text proposal for TR 36.9xx: Reducing HeNB interference by dynamically changing HeNB access mode", 3GPP DRAFT; R4-094688_DYNHENB_AMCHG_IM, 3rd Generation Partnership Project (3GPP), Mobile Competence Centre ; 650, Route Des Lucioles ; F-06921 Sophia-Antipolis Cedex ; France, No. Jeju; Nov. 9, 2009, Nov. 9, 2009 (Nov. 9, 2009), XP050394167, the whole document.

Saquib, et al., "Interference Management in OFDMA Femtocell Networks: Issues and Approaches", IEEE wireless communications, vol. 19, issue 3, DOI: 10.1109/MWC.2012.6231163, 2012, pp. 86-95.

Taiwan Search Report—TW102106433—TIPO—dated Aug. 27, 2014.

* cited by examiner

METHODS AND APPARATUS FOR SELECTING FEMTOCELL ACCESS MODES AND OPERATIONAL PARAMETERS BASED ON THE PRESENCE OF NEARBY MACROCELLS

CROSS-REFERENCE TO RELATED APPLICATION

The present Application for Patent claims priority to Provisional Application No. 61/602,989, filed Feb. 24, 2012, entitled "METHODS AND APPARATUS FOR SELECTING FEMTOCELL ACCESS MODES AND OPERATIONAL PARAMETERS BASED ON THE PRESENCE OF NEARBY MACROCELLS", which is assigned to the assignee hereof, and is hereby expressly incorporated in its entirety by reference herein.

BACKGROUND

Field

The present disclosure relates generally to communication systems, and more specifically to techniques for deploying small-coverage base stations (e.g., femtocells).

Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units or femto nodes, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, etc. With the increasing popularity of FAPs, there is a desire to optimize bandwidth and resource allocation.

SUMMARY

Methods and apparatus for deploying small-coverage base stations are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method operable by a network entity is disclosed for selecting an access mode operable by a small-coverage base station deployed in a wireless communications network. The method includes determining whether a target channel is being used by a macrocell. The method includes, in response to the target channel being used by the macrocell, configuring the access mode to a closed access mode. The method includes, in response to the target channel not being used by the macrocell, configuring the access mode to an open or hybrid access mode.

In another aspect, an apparatus for selecting an access mode of a small-coverage base station deployed in a wireless communications network includes at least one processor configured to: determine whether a target channel is being used by a macrocell; configure the access mode to a closed access mode, in response to the target channel being used by the macrocell; and configure the access mode to an open or hybrid access mode, in response to the target channel not being used by the macrocell. The apparatus includes a memory coupled to the at least one processor for storing data.

In another aspect, an apparatus for selecting an access mode of a small-coverage base station deployed in a wireless communications network. The apparatus includes means for determining whether a target channel is being used by a macrocell. The apparatus includes means for configuring the access mode to a closed access mode, in response to the target channel being used by the macrocell. The apparatus includes means for configuring the access mode to an open or hybrid access mode, in response to the target channel not being used by the macrocell.

In another aspect a computer program product includes a computer-readable medium including code for causing a computer to determine whether a target channel is being used by a macrocell, configure the access mode to a closed access mode, in response to the target channel being used by the macrocell, and configure the access mode to an open or hybrid access mode, in response to the target channel not being used by the macrocell.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
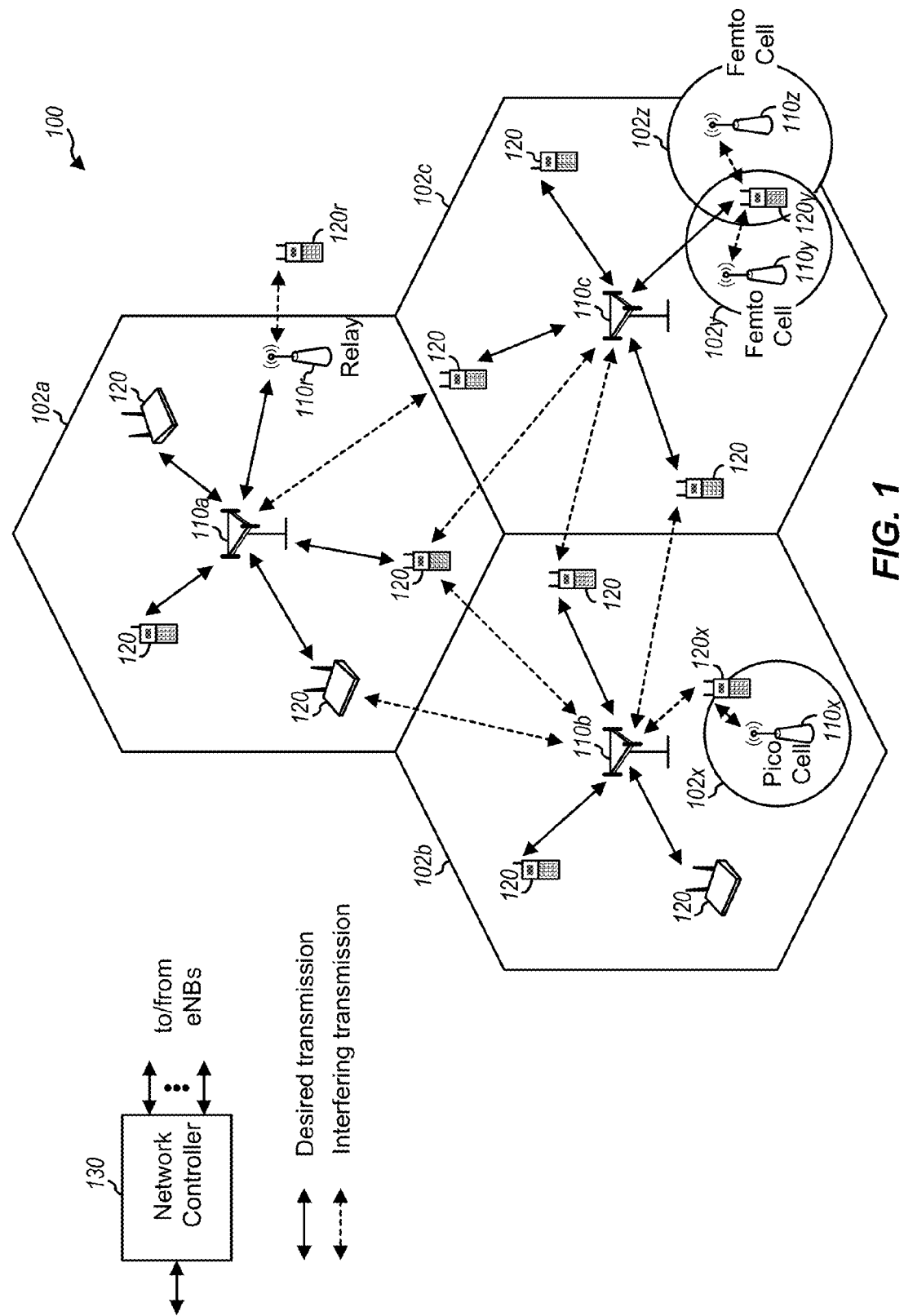
FIG. 1 is a block diagram conceptually illustrating an example of a telecommunications system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100, which may be an LTE network, is illustrated in accordance with various embodiments presented herein. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
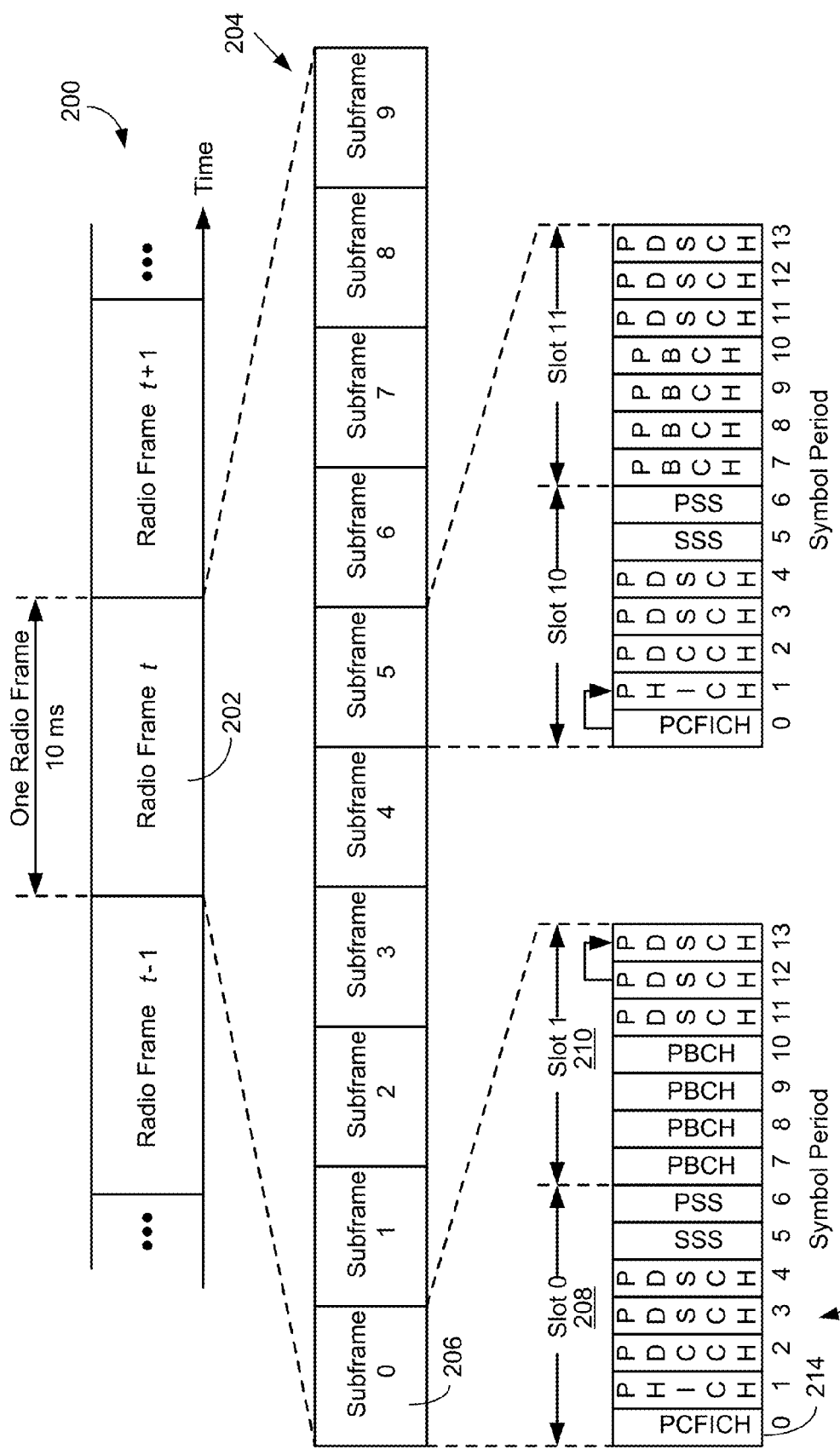
FIG. 2 is a block diagram conceptually illustrating an example of a down link frame structure in a telecommunications system.
Figure 6:
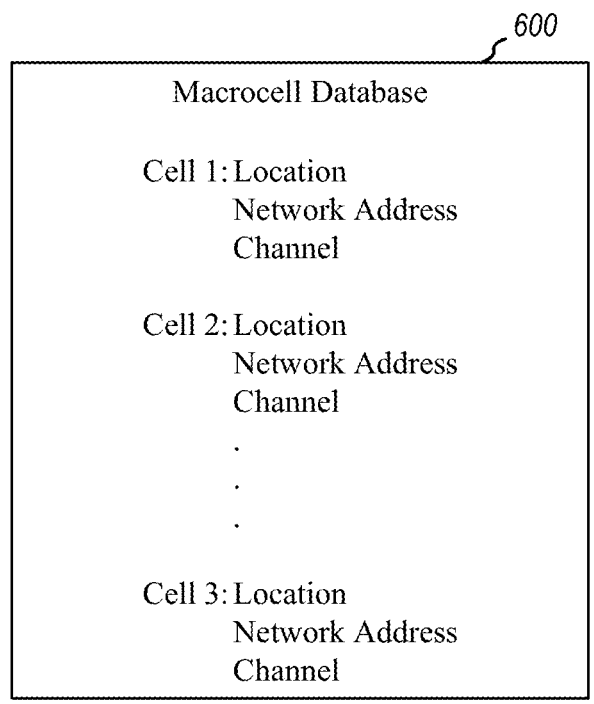
FIG. 6 illustrates an example macrocell database.

FIG. 2 shows a downlink frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
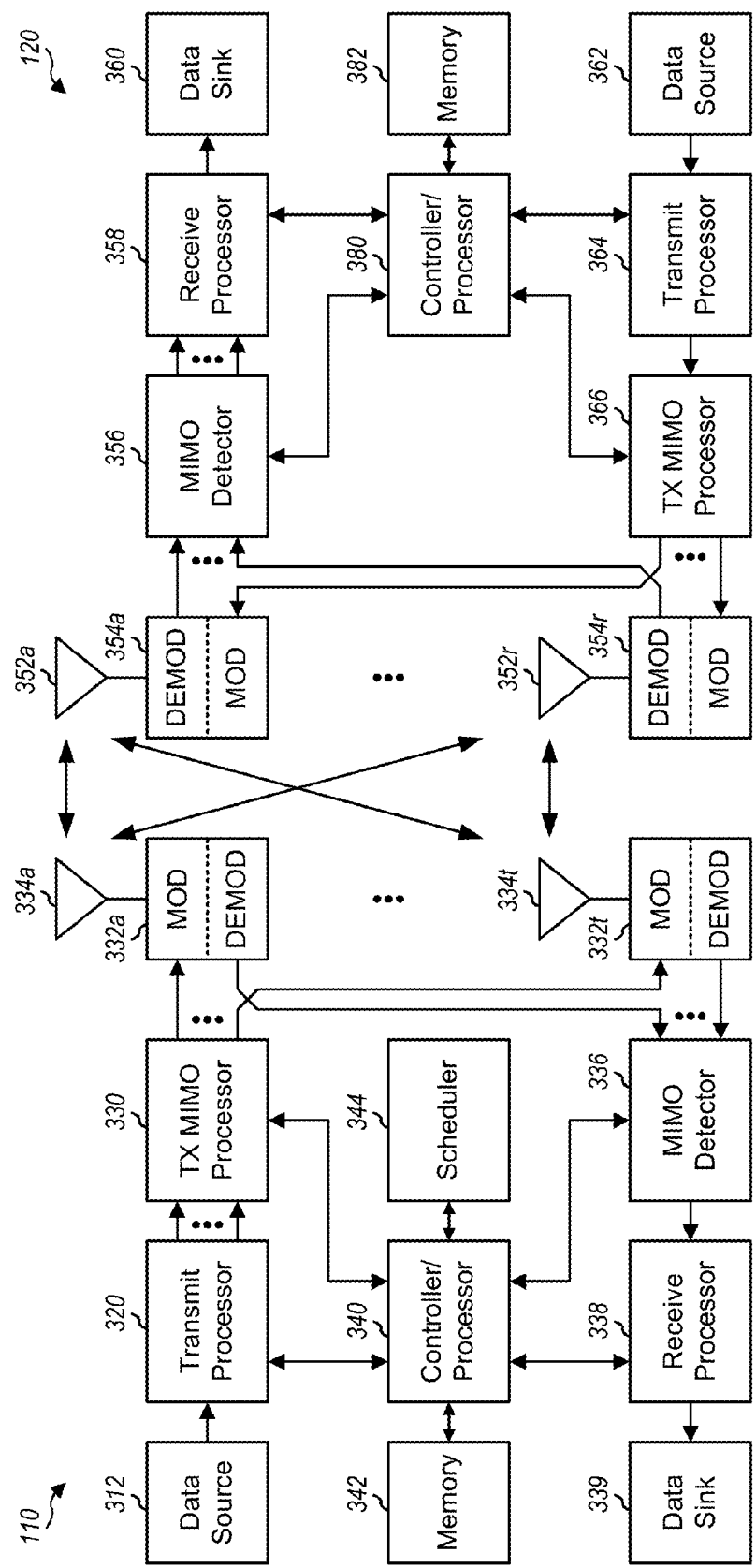
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
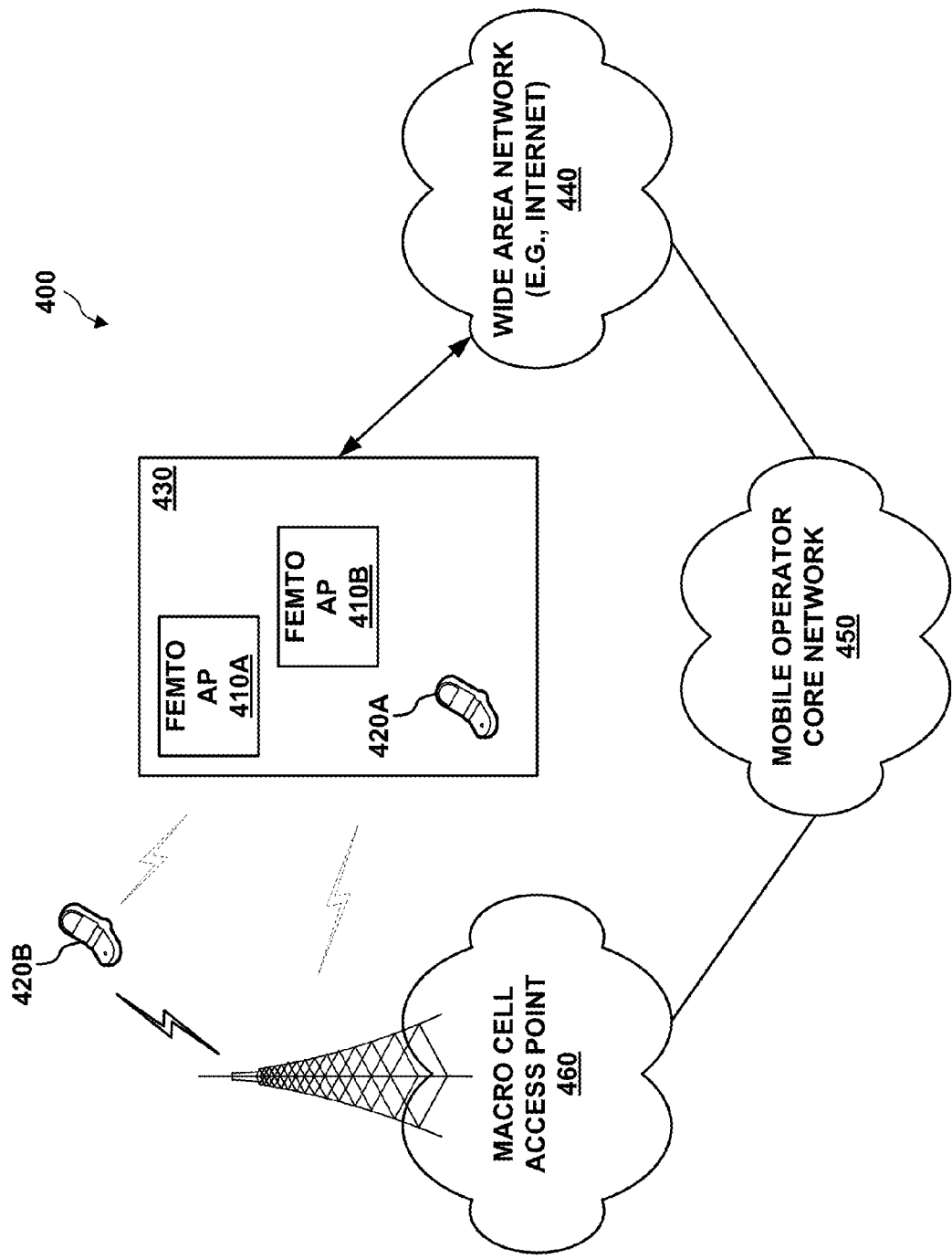
FIG. 4 is a block diagram illustrating another example communication system.

FIG. 4 illustrates an exemplary communication system 400 where one or more FAPs are deployed within a network environment. Specifically, the system 400 includes multiple FAPs 410A and 410B (e.g., FAPs or H(e)NB) installed in a relatively small scale network environment (e.g., in one or more user residences 430). Each FAP 410 can be coupled to a wide area network 440 (e.g., the Internet) and a mobile operator core network 450 via a digital subscriber line (DSL) router, a cable modem, a wireless link, or other connectivity means (not shown). As will be discussed below, each FAP 410 can be configured to serve associated access terminals 420 (e.g., access terminal 420A) and, optionally, alien access terminals 420 (e.g., access terminal 420B). In other words, access to FAPs 410 can be restricted such that a given access terminal 420 can be served by a set of designated (e.g., home) FAP(s) 410 but may not be served by any non-designated FAPs 410 (e.g., a neighbor's FAP).

Referring again to FIG. 4, the owner of a FAP 410 can subscribe to mobile service, such as, for example, 3G mobile service, offered through the mobile operator core network 450. In another example, the FAP 410 can be operated by the mobile operator core network 450 to expand coverage of the wireless network. In addition, an access terminal 420 can be capable of operating both in macro environments and in smaller scale (e.g., residential) network environments. Thus, for example, depending on the current location of the access terminal 420, the access terminal 420 can be served by a macro access point 460 or by any one of a set of FAPs 410 (e.g., the FAPs 410A and 410B that reside within a corresponding user residence 430). For example, when a subscriber is outside his home, he is served by a standard macro access point (e.g., node 460) and when the subscriber is at home, he is served by a FAP (e.g., node 410A). Here, it should be appreciated that a FAP 410 can be backward compatible with existing access terminals 420.

A FAP 410 can be deployed on a single frequency or, in the alternative, on multiple frequencies. Depending on the particular configuration, the single frequency or one or more of the multiple frequencies can overlap with one or more frequencies used by a macro access point (e.g., node 460). In some aspects, an access terminal 420 can be configured to connect to a preferred FAP (e.g., the home FAP of the access terminal 420) whenever such connectivity is possible. For example, whenever the access terminal 420 is within the user's residence 430, it can communicate with the home FAP 410.

In some aspects, if the access terminal 420 operates within the mobile operator core network 450 but is not residing on its most preferred network (e.g., as defined in a preferred roaming list), the access terminal 420 can continue to search for the most preferred network (e.g., FAP 410) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 420 can limit the search for specific band and channel. For example, the search for the most preferred system can be repeated periodically. Upon discovery of a preferred FAP, such as FAP 410, the access terminal 420 selects the FAP 410 for camping within its coverage area.

A FAP can be restricted in some aspects. For example, a given FAP can only provide certain services to certain access terminals. In deployments with so-called restricted (or closed) association, a given access terminal can only be served by the macro cell mobile network and a defined set of FAPs (e.g., the FAPs 410 that reside within the corresponding user residence 430). In some implementations, a FAP can be restricted to not provide, for at least one access terminal, at least one of: signaling, data access, registration, paging, or service.

In some aspects, a restricted FAP (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., FAPs) that share a common access control list of access terminals. A channel on which all FAPs (or all restricted FAPs) in a region operate can be referred to as a femto channel.

Various relationships can thus exist between a given FAP and a given access terminal. For example, from the perspective of an access terminal, an open FAP can refer to a FAP with no restricted association. A restricted FAP can refer to a FAP that is restricted in some manner (e.g., restricted for association and/or registration). A home FAP can refer to a FAP on which the access terminal is authorized to access and operate on. A guest FAP can refer to a FAP on which an access terminal is temporarily authorized to access or operate on. An alien FAP can refer to a FAP on which the access terminal is not authorized to access or operate on, except for perhaps emergency situations (e.g., 911 calls).

From a restricted FAP perspective, a home access terminal can refer to an access terminal that authorized to access the restricted FAP. A guest access terminal can refer to an access terminal with temporary access to the restricted FAP. An alien access terminal can refer to an access terminal that does not have permission to access the restricted FAP, except for perhaps emergency situations, for example, 911 calls (e.g., an access terminal that does not have the credentials or permission to register with the restricted FAP).

For convenience, the disclosure herein describes various functionality in the context of a FAP. It should be appreciated, however, that a pico node can provide the same or similar functionality as a FAP, but for a larger coverage area. For example, a pico node can be restricted, a home pico node can be defined for a given access terminal, and so on.

In accordance with one or more embodiments of the present disclosure, there are provided techniques for selecting femtocell access modes and operational parameters based on the presence of nearby macrocells.

A femtocell may choose its access control mode based on whether a macro cell is operating in the vicinity of the femtocell. This functionality gives operators the flexibility to deploy femtocell operating on the same channel in both areas where macro cell base stations are present, as well as areas containing no macrocells. When a macrocell exists on a target channel, it may be advantageous for the femtocell to operate in a closed access mode to improve the indoor coverage for femtocell owners. Operating in closed access mode in this scenario also allows the femtocell owners to offload traffic on the macrocell, as well as improving interference management to the macrocell.

In a different scenario, when the femtocell operates on the target channel when there is no nearby macrocell, it may be advantageous for the femtocell to operate in an open access mode with a higher transmit power to ensure a large coverage for all subscribers (including subscribers currently outdoors) in the vicinity of the femtocell. Operating in open access mode also allows the macrocell to offload UEs from the macrocell.

In accordance with one or more embodiments of the present disclosure, there are provided techniques for selecting an access mode and other operational parameters based on these different scenarios by detecting the presence of nearby macrocells. Specifically, a femtocell may choose its access control mode based on whether a macrocell is operating in the vicinity of the femtocell. This functionality gives operators the flexibility to deploy femtocell operating on the same channel in both areas where macro cell base stations are present, as well as areas containing no macrocell.

It is noted that when a macrocell exists on the target channel, then the femtocell should operate in closed access mode to improve indoor coverage for femtocell owners. It also provides capacity offload for femtocell owners. The femtocell should manage its interference to macrocell. On the other hand, when the femtocell operates in the channel that there is no nearby macrocell, then the femtocell can operate in open access mode with high transmit power to ensure large coverage for all subscribers in vicinity of femtocell. It also creates huge capacity increase by offloading UEs from macrocell.

One aspect of the techniques described herein involves switching the operation mode of the femtocells in a geographical region once the femtocell density is high enough (i.e., reached a defined threshold). Once the femtocell penetration reaches a threshold, then the operator may configure the macrocell to stop using a frequency channel. Femtocells can then be switched to open access mode which the macrocell stops using the channel based on: (a) detection of presence of macrocell can be done periodically at the femtocell to determine whether the macrocell has stopped using the channel; and/or (b) the provisioning server can command the femtocell to use the target channel and switch operation mode in conjunction with macrocell ceasing operation on the channel.

Another aspect of the techniques described herein involves how a femtocell can determine the existence of nearby macrocell operation on the target channel. In one embodiment, there are example approaches.

Figure 5:
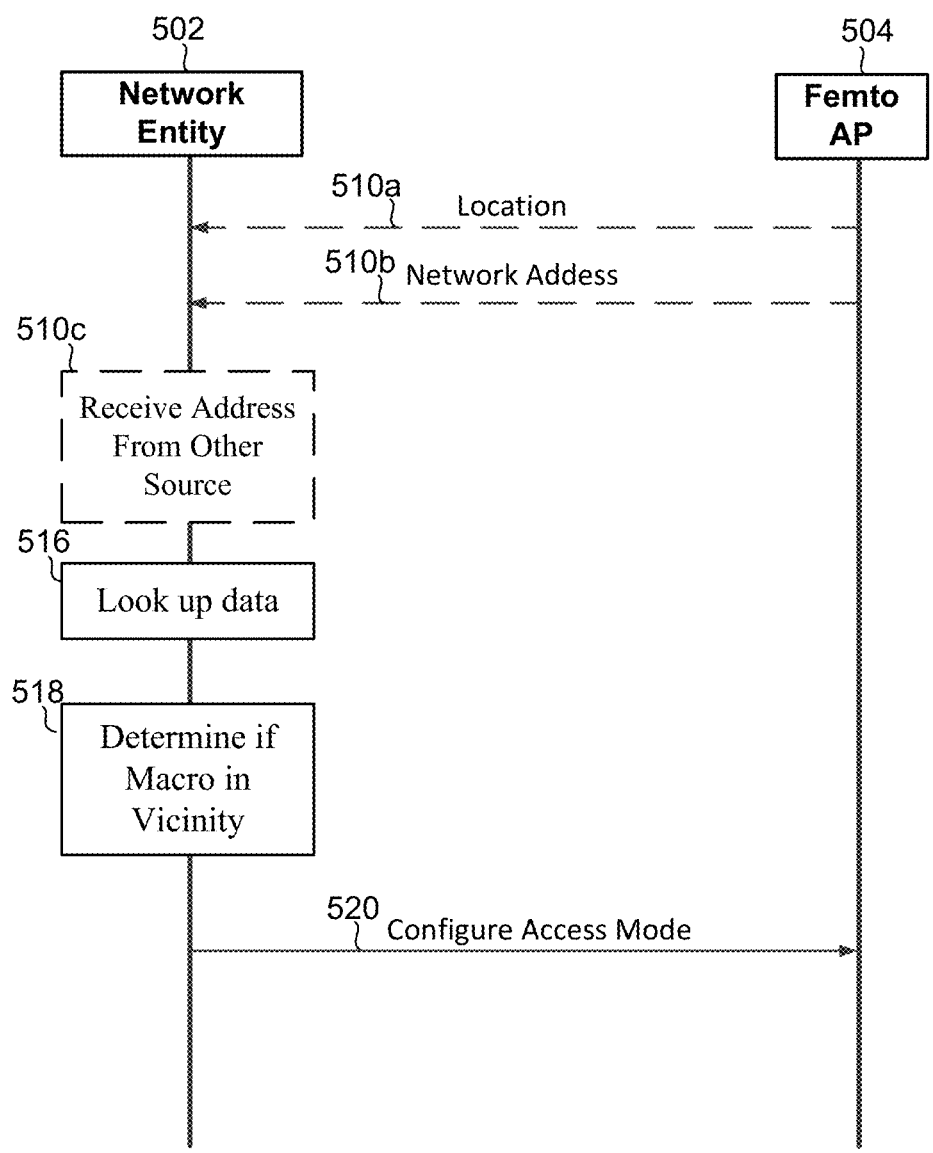
FIG. 5 illustrates an example flow diagram for configuring an access mode of a femto AP.

FIG. 5 illustrates an example flow diagram for configuring an access mode of a femto AP. In one embodiment, the access mode of a femto AP 504 may be configured by a network entity 502, such as a provisioning server. The network entity 502 may determine whether a macrocell is in the vicinity of the femto AP 504 and configure the access mode of the femto AP 504 based on the existence of the macrocell. If a macrocell is in the vicinity, the network entity 502 may configure the femto AP 504 for closed mode operation. If a macrocell is not in the vicinity, the network entity 502 may configure the femto AP 504 for open or hybrid mode operation.

In one aspect, the network entity 502 may determine whether a macrocell is in the vicinity based on a received location of the femto AP 504, at 510a. For example, the location may be an address, a GPS coordinate, etc. Based on the received location, the network entity 502 may look up the received location data, at 516. Based on the look up operation, the network entity 502 may determine whether a macrocell is in the vicinity at 518. In another aspect, the network entity 502 may determine whether a macrocell is in the vicinity based on a received network address of the femto AP 504, at 510b. For example, the network address may be internet protocol (IP) address, etc. Based on the received network address, the network entity 502 may look up whether a macrocell is in the vicinity at 516. In another aspect, the network entity 502 may determine whether a macrocell is in the vicinity based on obtaining a location of the femto AP 504 from another source, at 510c. For example, the network entity 502 may obtain a postal address, GPS coordinate, etc. from an operator or user of the femto AP 504.

After the network entity 502 receives or obtains the location information of the femto AP 504, the network entity 502 may compare the location information against a data set. For example, the data set may be a database, a look up table, a hash table, etc. FIG. 6 illustrates an example macrocell database 600. The database may store a list of cells along with information pertaining to the cells. For example, the cells may include any or all of a location, network address, and one or more channels that the macrocell operates on. The network entity 502 may compare the location information of the femto AP 504 with the location or network address of the cells in the database 600. Based on the comparison, the network entity 502 may determine one or more cells in the vicinity of the femto AP 504. The comparison function may be based on a proximity or signal level threshold. For example, the network entity may consider a cell to be in the vicinity if the cell is within, e.g., a mile radius or 3 dB, threshold of the cell. If the network entity 502 determines that a macrocell exists in the vicinity of the femto AP 504, then the network entity 502 may configure the femto AP 504 for closed mode operation. If the network entity 502 determines that a macrocell does not exist in the vicinity of the femto AP 504, then the network entity 502 may configure the femto AP 504 for open or hybrid mode operation.

In one example, the network entity 502 may be configured as a provisioning server 502. The femto AP 504, after being powered on, may determine its GPS coordinate, e.g., using a GPS receiver at the femto AP 504. The femto AP 504 transits its GPS coordinate to the provisioning server 502. The provisioning server 502, in this example, is pre-configured with a database 600 including a set of macrocells. The information for each macrocell includes a GPS coordinate and a set of channels the macrocells operate on. In one aspect, the provisioning server 502 compares the GPS coordinate of the femto AP 504 and finds a macrocell (e.g., cell 2) in the vicinity. The provisioning server configures the femto AP 504 for closed mode operation at 520. In another aspect, the provisioning server 502 compares the GPS coordinate of the femto AP 504 and does not find a macrocell in the vicinity. The provisioning server 502 then configures the femto AP 504 for open mode operation.

Figure 7:
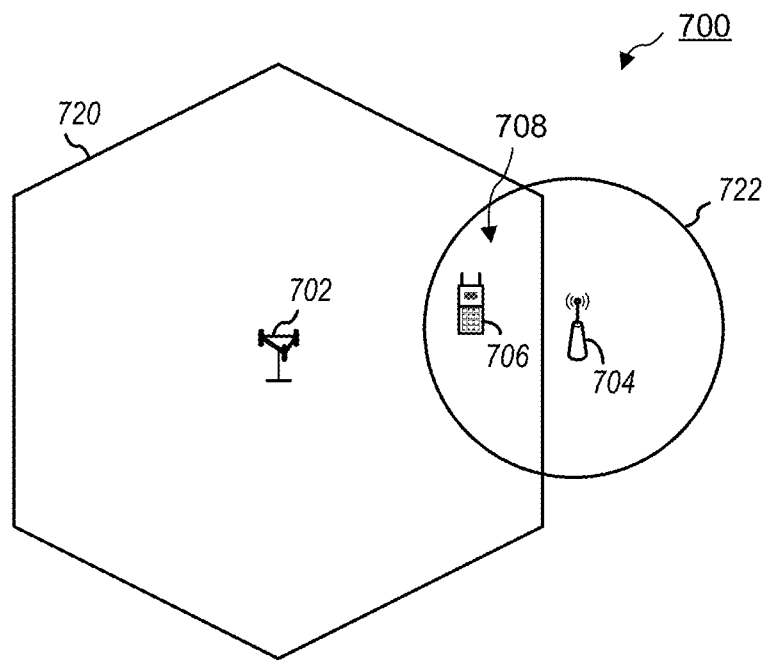
FIG. 7 illustrates an example communication system illustrating a hidden node.

FIG. 7 illustrates an example communication system illustrating a hidden node. The communication system 700 may include a macrocell AP 702, femtocell AP 704, and a UE 706. The macrocell 720 and femtocell 722 may be in proximity and provide overlapping coverage. The femtocell AP 704 may be located outside of the macrocell 720, and the femtocell AP 704 may not receive or detect signals from the macrocell 720. The UE 706 may be located in the overlapping region 708 and may receive or detect signals from both the femtocell 722 and macrocell 720. In this case, a hidden node issue may arise because the macro AP 702 may not detect the femtocell 722, and the femto AP 704 may not detect the macrocell 720 even though the two cells 720, 722 are close with the overlapping region 708. The UE 706, however, may be used to resolve the hidden node issue. The UE 706 may send an indication of the presence of the macrocell 720 to the femto AP 704, or the UE 706 may send an indication of the presence of the femtocell 722 to the macro AP 702. In one aspect, the femto AP 704 may request the UE 706 to detect the presence of macrocells, e.g., macrocell 720, in the vicinity of the UE 706. The UE 706 may detect macrocell 720 and send an indication of the existence of the macrocell 720 to the femto AP 704.

Figure 8:
FIG. 8 is a flow diagram illustrating detection of a macrocell in the vicinity of a femto AP.

FIG. 8 is a flow diagram illustrating detection of a macrocell in the vicinity of a femto AP. A femto AP 504 may determine whether a target channel is used by a macrocell based on broadcast messages or other transmission by a macro AP 806. The femto AP 504 may monitor, e.g., at a network listen module (NLM), for broadcast messages or other transmissions from the macro AP 806. At step 820, the femto AP 504 may receive a broadcast message from the macro AP 806. The broadcast message may include a pilot identifier, e.g., a primary scrambling code (PSC) or physical channel ID. Based on the broadcast message, the femto AP 504 may determine that the macro AP 806 operates on a target channel. The femto AP 504 may configure itself for closed mode operation at step 824. In another aspect, the femto AP 504 may not detect any broadcast messages or other transmissions from the macro AP at step 820. In this case, the femto AP 504 may configure itself for open mode operation at step 824. The femto AP 504 may monitor other channels, e.g., from the same operators, for transmissions. If other channels are used by the same macro AP 806, the macro AP 806 may be present but not operating on the target channel. In this case, the femto AP 504 may operate in open access mode on the target channel without interference to the macrocell on the target channel.

Figure 9:
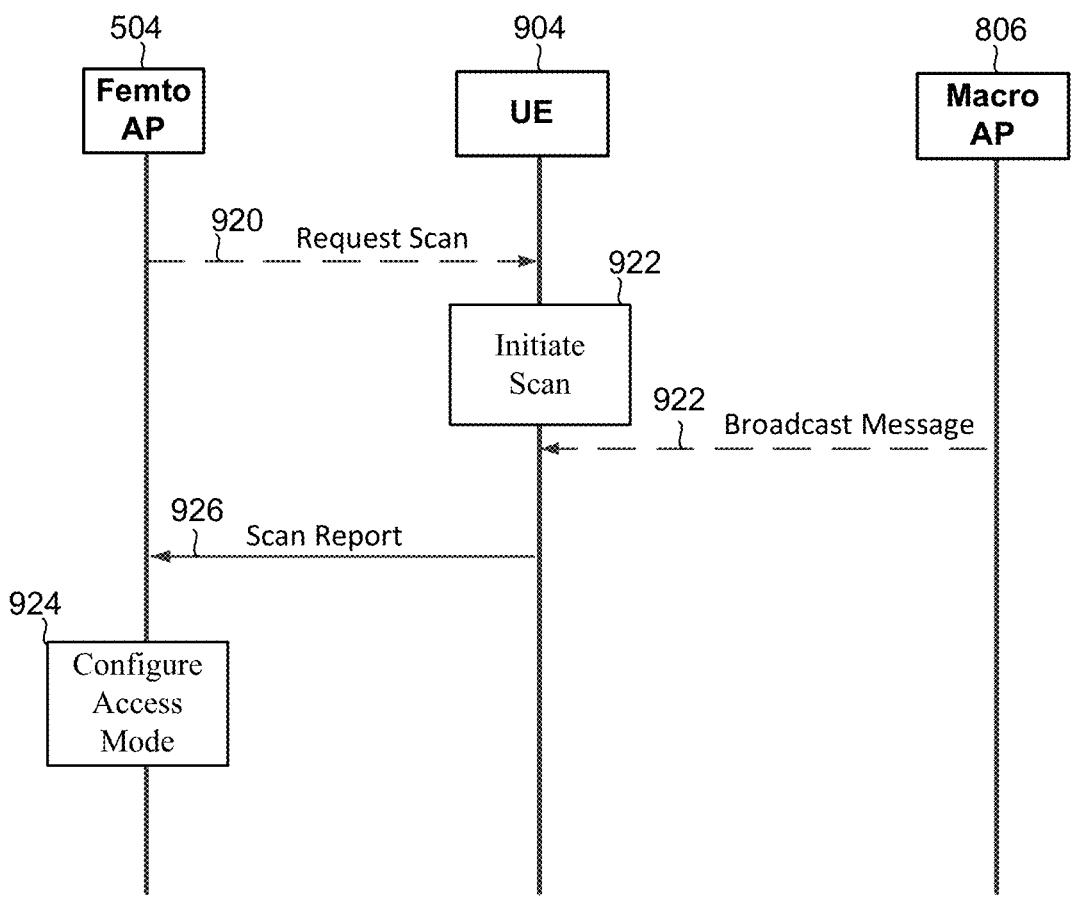
FIG. 9 illustrates a flow diagram for determination of a macrocell in the vicinity of a femto AP based on UE assistance.

FIG. 9 illustrates a flow diagram for determination of a macrocell in the vicinity of a femto AP based on UE assistance. An issue may arise in case the femto AP 504 does not detect any broadcast messages or other transmissions from a macro AP 806. For example, the macro AP 806 may be close to the location of the femto AP 504, but may be hidden from the femto AP 504, e.g., as discussed above with reference to FIG. 7. With respect to the hidden node issue, UEs may be used to resolve the issue. For example, the femto AP 504 may not detect signals from a macrocell, however, a UE 904 may be in the overlapping coverage area and detect signals and communicate with both the femto AP 504 and macro AP 806. Because UEs are mobile, a UE may not be in the location of the overlapping coverage area at all times. However, a large number of UEs may increase the chances that at least one UEs may be in the overlapping coverage area between a macrocell and femtocell to help resolve the hidden node issue.

In one aspect, a femto AP 504 may request assistance from UEs 904 to discover hidden nodes. In another aspect, the UEs 904 may send indications of macro AP 806 without a request from the femto AP 504.

At step 920, the femto AP 504 may request the UE 904 to scan for macrocells. For example, UE 904 may be the UE 706 of FIG. 6 located in the overlapping region 708 of both the femtocell 722 and macrocell 720. Based on the scan request from femto AP 504, the UE 904 may initiate a scan for cells at step 922. The UE 904 may detect macrocells based on received broadcast messages or other transmissions from the macrocell, e.g., from macro AP 806. If the UE 904 detects one or more macrocells, the UE 904 may include the macrocell information in a scan report to the femto AP 504, at step 926. The scan report may include the pilot identifiers, e.g., primary scrambling code or physical channel ID, of the macrocells. Based on the scan report the femto AP 504 may configure an access mode at step 924. If the scan report indicates a macrocell operating on the target channel, the femto AP 504 may configure itself for closed mode operation at step 924. If the scan report indicates no macrocells or no macrocell operating on the target channel, the femto AP 504 may configure itself for open mode operation at step 924.

Figure 10:
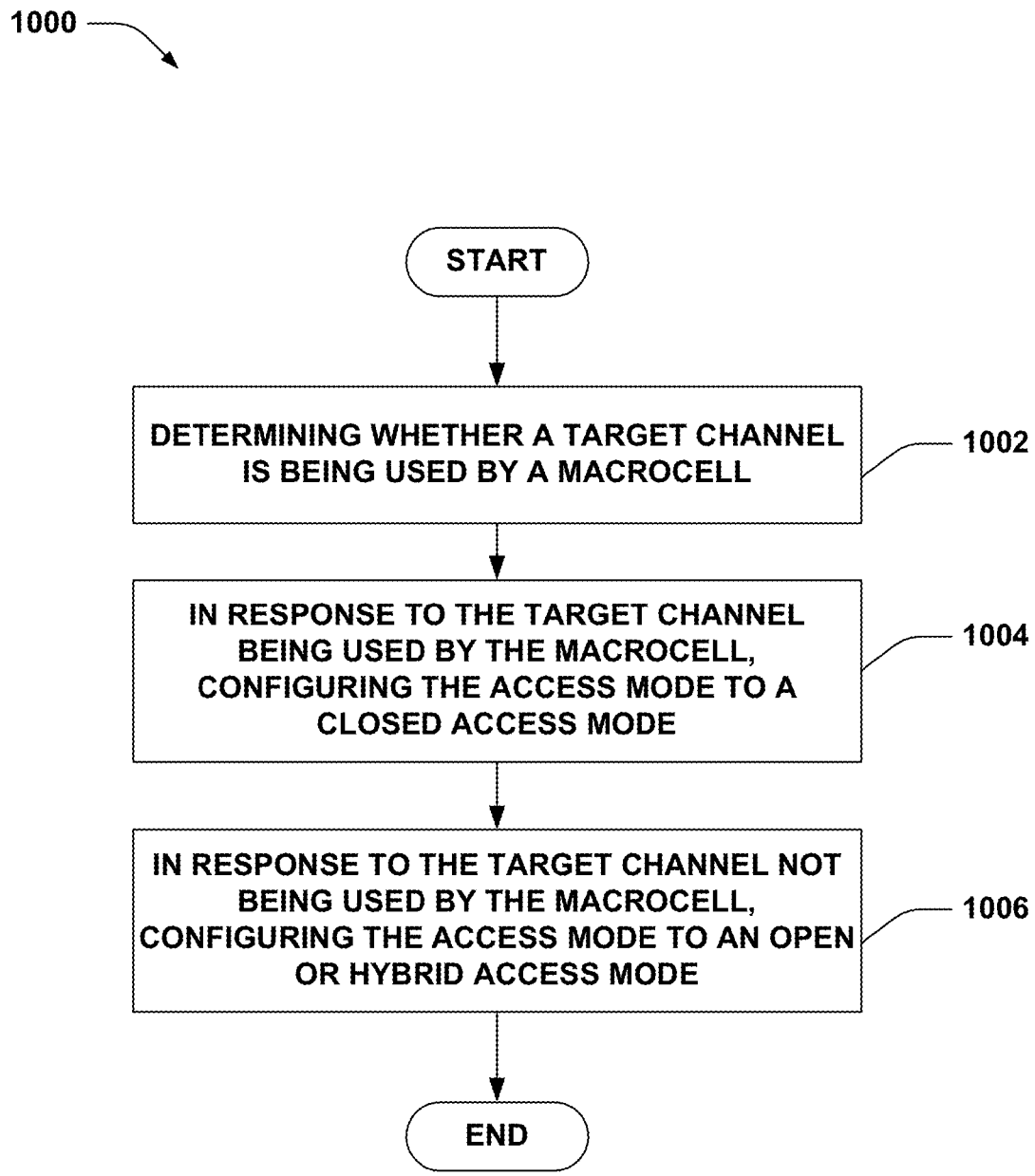
FIGS. 10-11 illustrate aspects of methodologies for configuring an access mode of a small-coverage base station.

In accordance with one or more aspects of the embodiments described herein, with reference to FIG. 10, there is shown a methodology 1000, operable by a network entity or femto node. For example, the network entity may be a provisioning server, or the like. Specifically, method 1000 describes a technique to configuring an access mode for a small-coverage base station (e.g., a femtocell or the like). The method 1000 may involve, at 1002, determining whether a target channel is being used by a macrocell. The method 1000 may involve, at 1004, in response to the target channel being used by the macrocell, configuring the access mode to a closed access mode. Further, the method may involve, at 1006, in response to the target channel not being used by the macrocell, configuring the access mode to an open or hybrid access mode.

Figure 11:
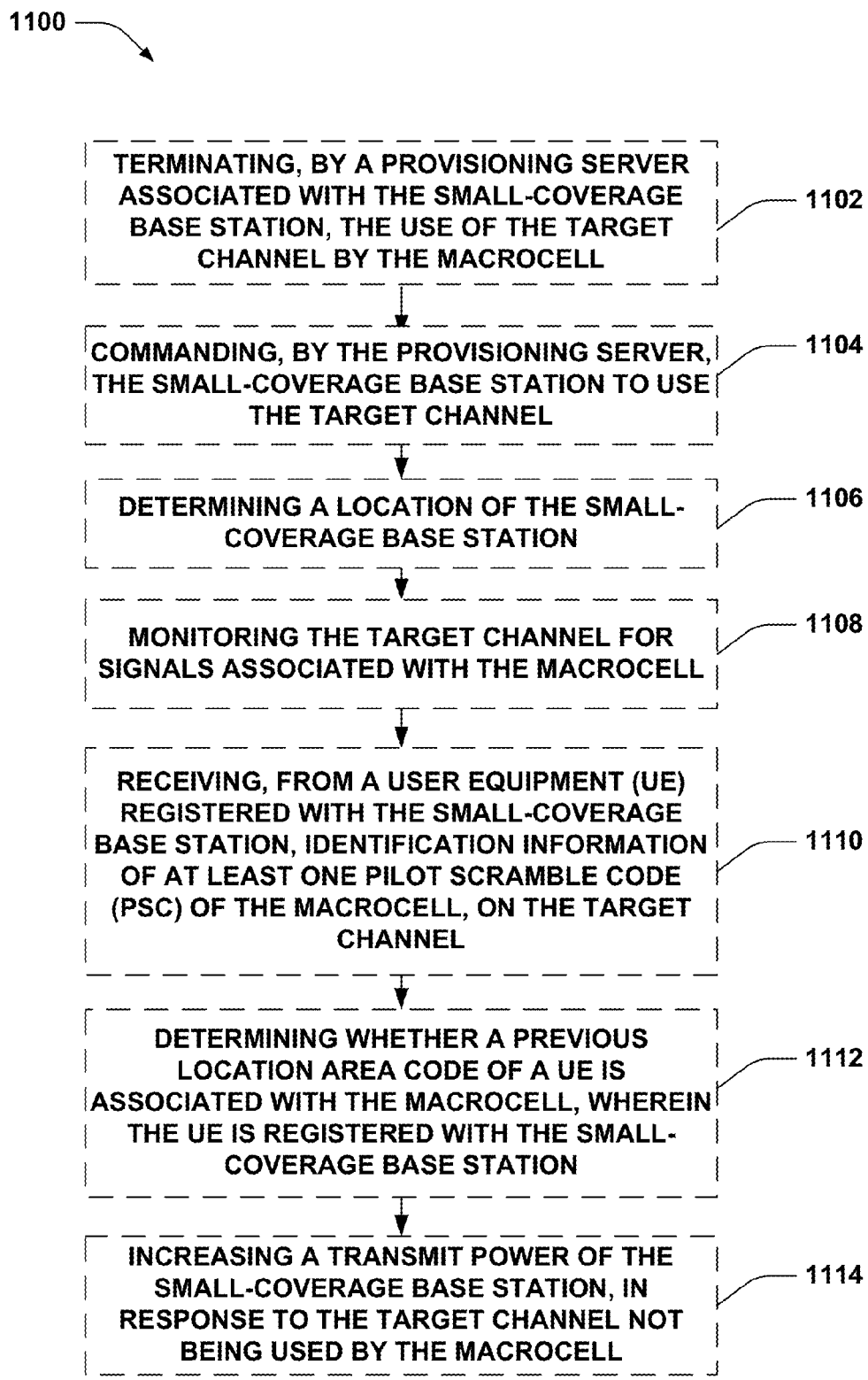

With reference to FIG. 11, there are shown further operations 1100 or aspects of the method 1000 that are optional and may be performed by a network entity, femto node, or the like. If the method 1100 includes at least one block of FIG. 11, then the method 1100 may terminate after the at least one block, without necessarily having to include any subsequent downstream block(s) that may be illustrated. It is further noted that numbers of the blocks do not imply a particular order in which the blocks may be performed according to the method 1100. For example, the method 1100 may further involve, at 1102, terminating, by a provisioning server associated with the small-coverage base station, the use of the target channel by the macrocell. The method 1100 may further involve, at 1104, commanding, by the provisioning server, the small-coverage base station to use the target channel. The method 1100 may further involve, at 1106, determining a location of the small-coverage base station. The method 1100 may further involve, at 1108, monitoring the target channel for signals associated with the macrocell. The method 1100 may further involve, at 1110, receiving, from a user equipment (UE) registered with the small-coverage base station, identification information of at least one pilot scramble code (PSC) of the macrocell, on the target channel. The method 1100 may further involve, at 1112, determining whether a previous location area code of a UE is associated with the macrocell, wherein the UE is registered with the small-coverage base station. The method 1100 may further involve, at 1114, increasing a transmit power of the small-coverage base station, in response to the target channel not being used by the macrocell.

Figure 12:
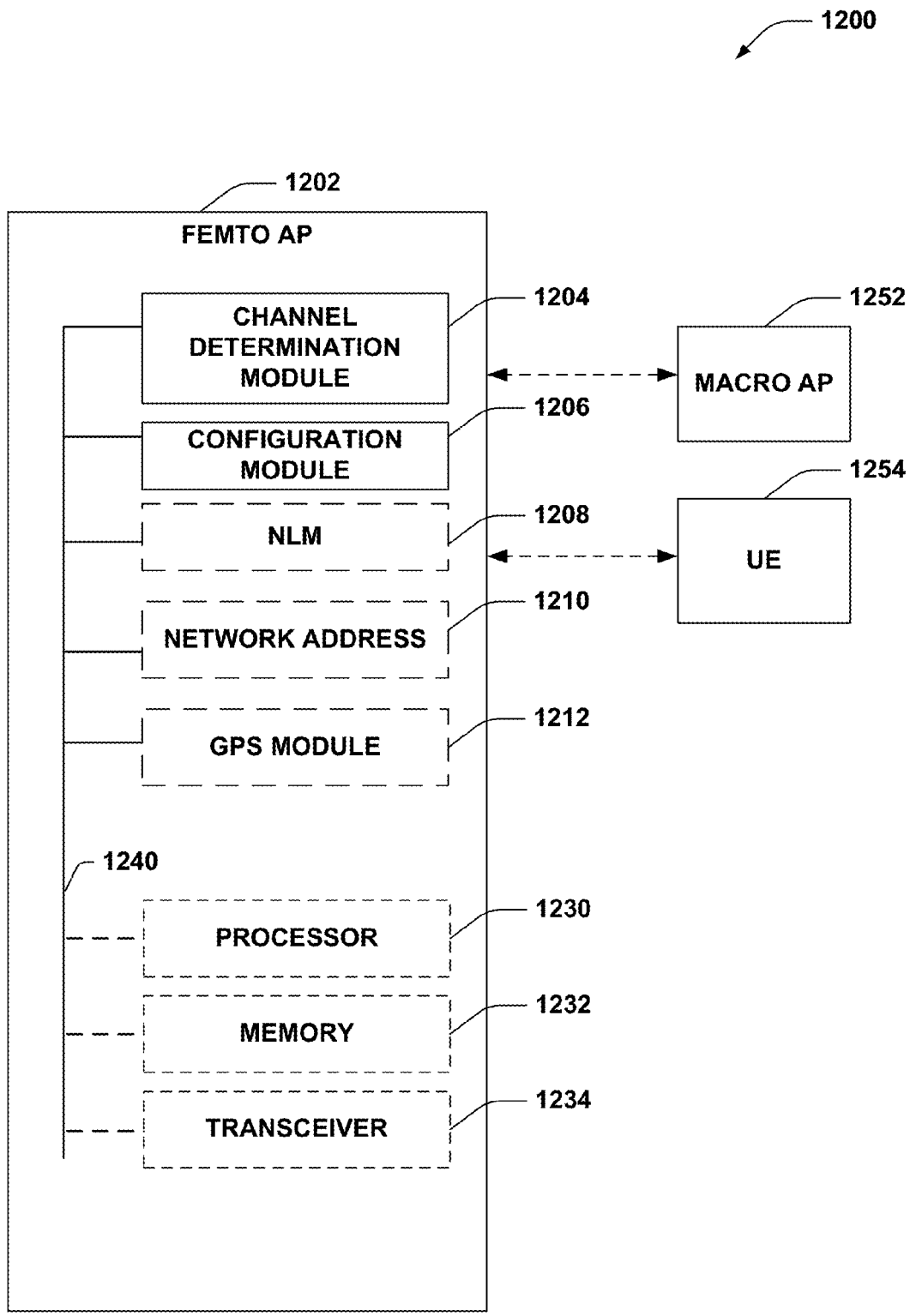
FIG. 12 shows an embodiment configuring an access mode for a small-coverage base station, in accordance with the methodologies of FIGS. 10-11.

With reference to FIG. 12, there is provided an exemplary apparatus 1202 that may be configured as a femto AP, or the like, in a wireless system 1200, or as a processor or similar device/component for use within the apparatus. The apparatus 1202 may include functional blocks that can represent functions implemented by a processor, software, or combination thereof (e.g., firmware). For example, apparatus 1202 may include a channel determination module 1204 for determining whether a target channel is being used by a macrocell (e.g., of macro AP 1252).

The channel determination module 1204 may determine determining whether the target channel is being based on monitoring at an NLM module 1208. For example, the NLM module 1208 may monitor for broadcast messages or other transmissions from, e.g., macro AP 806. The apparatus 1202 may include a GPS module for determining a location, e.g., a GPS coordinate of the apparatus. The apparatus 1202 may transmit its location to a network entity such as a provisioning server. The apparatus 1202 may include a network address such as an IP address. The apparatus 1202 may transmit its network address to a network entity such as a provisioning server.

The channel determination module 1204 may be, or may include, means for determining whether a target channel is being used by a macrocell. Said channel determination means may include, for example, one or more of algorithms 1002 described above in connection with FIG. 10. For example, apparatus 1202 may include a configuration module 1206 for configuring the access mode to a closed access mode in response to the target channel being used by the macrocell. The configuration module 1206 may configure the access mode to an open or hybrid access mode in response to the target channel not being used by the macrocell. The configuration module 1206 may be, or may include, means for configuring the access mode to a closed access mode in response to the target channel being used by the macrocell. The configuration module 1206 may be, or may include, means for configuring the access mode to an open or hybrid access mode in response to the target channel not being used by the macrocell. Said configuration means may include, for example, one or more of algorithms 1004, 1006 described above in connection with FIG. 10.

Additionally, the apparatus 1202 may include a memory 1232 that retains instructions for executing functions associated with the components 1204-1212. While shown as being external to memory 1232, it is to be understood that one or more of the components 1204-1212 may exist within memory 1232. In one example, components 1204-1212 may comprise at least one processor, or each component 1204-1212 may be a corresponding module of at least one processor. Moreover, in an additional or alternative example, components 1204-1212 may be a computer program product comprising a computer readable medium, where each component 1204-1212 may be corresponding code.

In related aspects, the apparatus 1202 may optionally include a processor component 1230 having at least one processor. The processor 1230, in such case, may be in operative communication with the components 1204-1212 via a bus 1240 or similar communication coupling. The processor 1230 may effect initiation and scheduling of the processes or functions performed by components 1204-1212.

In further related aspects, the apparatus 1202 may include a radio transceiver component 1234. A stand-alone receiver and/or stand-alone transmitter can be used in lieu of or in conjunction with the transceiver component 1234. The transceiver 1234 may be configured for communication with macro AP 1252 or UE 1254. The apparatus 1202 may also include a network interface (not shown) for connecting to one or more network entities, such as macro AP 1252.

Figure 13:
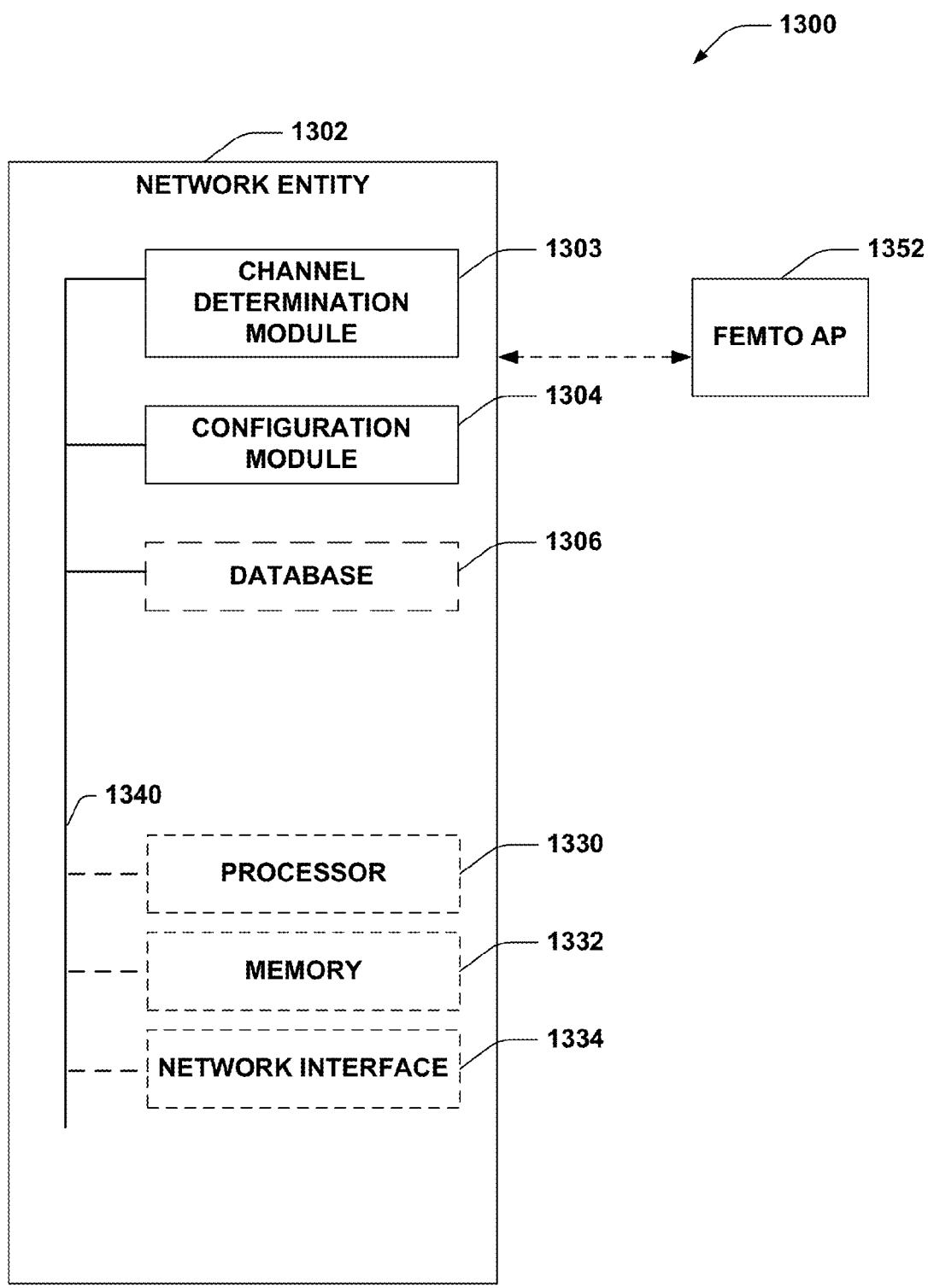
FIG. 13 shows another embodiment of an apparatus configuring an access mode for a small-coverage base station, in accordance with the methodologies of FIGS. 10-11.

With reference to FIG. 13, there is provided an exemplary apparatus 1302 that may be configured as a network entity, such as a provisioning server or the like, in a wireless system 1300, or as a processor or similar device/component for use within the apparatus 1302. The apparatus 1302 may include functional blocks that can represent functions implemented by a processor, software, or combination thereof (e.g., firmware). For example, apparatus 1302 may include a channel determination module 1303 for determining whether a target channel is being used by a macrocell (e.g., of macro AP found in database 1306). The channel determination module 1303 may be, or may include, means for determining whether a target channel is being used by a macrocell. Said channel determination means may include, for example, one or more of algorithms 1002 described above in connection with FIG. 10. For example, apparatus 1302 may include a database 1306 for storing cell information. The channel determination module 1304 may be configured to determine whether a target channel is being based on a search of the database 1306. For example, apparatus 1302 may include a configuration module 1304 for configuring the access mode to a closed access mode in response to the target channel being used by the macrocell. The configuration module 1304 may be for configuring an access mode of, e.g., femto AP 1352. The configuration module 1304 may configure the access mode to an open or hybrid access mode in response to the target channel not being used by the macrocell. The configuration module 1304 may be, or may include, means for configuring the access mode to a closed access mode in response to the target channel being used by the macrocell. The configuration module 1304 may be, or may include, means for configuring the access mode to an open or hybrid access mode in response to the target channel not being used by the macrocell. Said configuration means may include, for example, one or more of algorithms 1004, 1006 described above in connection with FIG. 10.

Additionally, the apparatus 1302 may include a memory 1332 that retains instructions for executing functions associated with the components 1302-1306. While shown as being external to memory 1332, it is to be understood that one or more of the components 1302-1306 may exist within memory 1332. In one example, components 1302-1306 may comprise at least one processor, or each component 1302-1306 may be a corresponding module of at least one processor. Moreover, in an additional or alternative example, components 1302-1306 may be a computer program product comprising a computer readable medium, where each component 1302-1306 may be corresponding code.

In related aspects, the apparatus 1302 may optionally include a processor component 1330 having at least one processor. The processor 1330, in such case, may be in operative communication with the components 1302-1306 via a bus 1340 or similar communication coupling. The processor 1330 may effect initiation and scheduling of the processes or functions performed by components 1302-1306.

In further related aspects, the apparatus 1302 may include a network interface component 1334. The network interface component 1334 may be configured for communication with femto AP 1352 and/or other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of selecting an access mode operable by a small-coverage base station deployed in a wireless communications network, the method comprising:

terminating operations in a target channel in response to receiving a command by a provisioning server associated with the small-coverage base station;

receiving information indicative of an operating channel of a macrocell by the small-coverage base station, wherein the information indicative of the operating channel of the macrocell indicates the operating channel of the macrocell in a proximity of the small-coverage base station;

detecting whether the operating channel is the same or different than the target channel of the small-coverage base station by the small-coverage base station, wherein detecting whether the operating channel is the same or different than the target channel further comprises:

receiving, from a user equipment (UE) registered with the small-coverage base station, identification information of the macrocell, on the target channel, or determining whether a previous location area code of a UE registered with the small-coverage base station is associated with the macrocell;

configuring the access mode to operate in a closed access mode if the operating channel is the same as the target channel by the small-coverage base station;

configuring the access mode to operate in an open or a hybrid access mode in the target channel if that the operating channel is different than the target channel by the small-coverage base station; and increasing a transmit power for communications on the target channel by the small-coverage base station if that the operating channel is different than the target channel.

2. The method of claim 1, further comprising, at a subsequent time operating in the target channel in response to receiving a command by a provisioning server,
wherein the command by the provisioning server is received subsequent to a change of the operating channel of the macrocell from the target channel to a different channel.

3. The method of claim 1, wherein detecting whether the operating channel is the same or different than the target channel further comprises determining a location of the small-coverage base station.

4. The method of claim 3, wherein the location is based on an internet protocol (IP) address associated with the small-coverage base station.

5. The method of claim 3, wherein the location is based on global positioning system (GPS) coordinates of the small-coverage base station.

6. The method of claim 3, wherein the location is based on an installation address of the small-coverage base station.

7. The method of claim 1, wherein detecting whether the operating channel is the same or different than the target channel further comprises monitoring the target channel for signals associated with the macrocell.

8. The method of claim 1, further comprising:
after detecting that the operating channel is the same as the target channel, detecting that the operating channel is different than the target channel; and
in response to detecting that the operating channel is different than the target channel, configuring, by the small-coverage base station, the access mode to operate in the open or the hybrid access mode in the target channel.

9. An apparatus for selecting an access mode of a small-coverage base station deployed in a wireless communications network, comprising:
at least one processor of the small-coverage base station configured to:
terminate operations in a target channel in response to receiving a command by a provisioning server associated with the small-coverage base station;
receive information indicative of an operating channel of a macrocell, wherein the information indicative of the operating channel of the macrocell indicates the operating channel of the macrocell in a proximity of the small-coverage base station;
detect whether the operating channel is the same or different than the target channel of the small-coverage base station, wherein to detect whether the operating channel is the same or different than the target channel, the at least one processor of the small-coverage base station is further configured to:
receiving, from a user equipment (UE) registered with the small-coverage base station, identification information of the macrocell, on the target channel, or
determining whether a previous location area code of a UE registered with the small-coverage base station is associated with the macrocell;
configure the access mode to operate in a closed access mode, if the operating channel is the same as the target channel;
configure the access mode to operate in an open or a hybrid access mode in the target channel, if the operating channel is different than the target channel; and
increase a transmit power for communications on the target channel by the small-coverage base station if the operating channel is different than the target channel in the proximity of the small-coverage base station; and
a memory coupled to the at least one processor for storing data.

10. The apparatus of claim 9, wherein, when the at least one processor detects whether the operating channel is the same or different than the target channel, the at least one processor is further configured to determine a location of the small-coverage base station.

11. The apparatus of claim 10, wherein the location is based on an internet protocol (IP) address associated with the small-coverage base station.

12. The apparatus of claim 10, wherein the location is based on global positioning system (GPS) coordinates of the small-coverage base station.

13. The apparatus of claim 10, wherein the location is based on an installation address of the small-coverage base station.

14. The apparatus of claim 9, wherein, when the at least one processor detects whether the operating channel is the same or different than the target channel, the at least one processor is further configured to monitor the target channel for signals associated with the macrocell.

15. The apparatus of claim 9, wherein the small-coverage base station comprises a femtocell or a picocell.

16. The apparatus of claim 9, wherein the at least one processor is further configured to:
after detecting that the operating channel is the same as the target channel, detect that the operating channel is different than the target channel; and
in response to detecting that the operating channel is different than the target channel, configure the access mode to operate in the open or the hybrid access mode in the target channel.

17. An apparatus for selecting an access mode of a small-coverage base station deployed in a wireless communications network, the apparatus comprising:
means for terminating operations in a target channel in response to receiving a command by a provisioning server associated with the small-coverage base station;
means for receiving information indicative of an operating channel of a macrocell by the small-coverage base station, wherein the information indicative of the operating channel of the macrocell indicates the operating channel of the macrocell in a proximity of the small-coverage base station;
means for detecting whether the operating channel is the same or different than the target channel of the small-coverage base station by the small-coverage base station, wherein the means for detecting whether the operating channel is the same or different than the target channel further comprises:
means for receiving, from a user equipment (UE) registered with the small-coverage base station, identification information of the macrocell, on the target channel, or
means for determining whether a previous location area code of a UE registered with the small-coverage base station is associated with the macrocell;
means for configuring the access mode to operate in a closed access mode, if the operating channel is the same as the target channel by the small-coverage base station;

means for configuring the access mode to operate in an open or a hybrid access mode, if the operating channel is different than the target channel by the small-coverage base station; and means for increasing a transmit power for communications on the target channel if the operating channel is different than the target channel.

18. The apparatus of claim 17, wherein the means for detecting further comprises means for determining a location of the small-coverage base station.

19. The apparatus of claim 18, wherein the location is based on an internet protocol (IP) address associated with the small-coverage base station.

20. The apparatus of claim 18, wherein the location is based on global positioning system (GPS) coordinates of the small-coverage base station.

21. The apparatus of claim 18, wherein the location is based on an installation address of the small-coverage base station.

22. The apparatus of claim 17, wherein the means for detecting further comprise means for monitoring the target channel for signals associated with the macrocell.

23. A non-transitory computer-readable medium comprising code for causing a processor of a small-coverage base station to:
 terminate operations in a target channel in response to receiving a command by a provisioning server associated with the small-coverage base station;
 receive information indicative of an operating channel of a macrocell by a small coverage base station, wherein the information indicative of the operating channel of the macrocell indicates the operating channel of the macrocell in a proximity of the small-coverage base station;
 detect whether the operating channel is the same or different than the target channel of the small-coverage base station, wherein, when the code causes the processor to detect whether the operating channel is the same or different than the target channel, the code further causes the processor to receive, from a user equipment (UE) registered with the small-coverage base station, identification information of the macrocell on the target channel, or to determine whether a previous location area code of a UE registered with the small-coverage base station is associated with the macrocell;
 configure the access mode to operate in a closed access mode, if the operating channel is the same as the target channel;
 configure, by the small-coverage base station, the access mode to operate in an open or a hybrid access mode in the target channel, if the macrocell does not operate in the target in the proximity of the small-coverage base station by the small-coverage base station; and
 increase a transmit power for communications on the target channel by the small-coverage base station if the operating channel is different than the target channel.

24. The non-transitory computer-readable medium of claim 23, wherein the information indicative of the operating channel is received from a user equipment (UE) registered with the small-coverage base station and includes identification information of the macrocell, and wherein, when the code causes the processor to detect whether the operating channel is the same or different than the target channel, the code further causes the processor to:
 determine a location of the small-coverage base station based on an installation address of the small-coverage base station;
 determine, based on the identification information, that a previous location associated with the UE registered with the small-coverage base station is associated with the macrocell; and
 detect that the operating channel is the same or different than the target channel of the small-coverage base station based on the determined location of small-coverage base station and the previous location.

25. The non-transitory computer-readable medium of claim 24, wherein the location is further determined based on an internet protocol (IP) address associated with the small-coverage base station.

26. The non-transitory computer-readable medium of claim 24, wherein the location is further determined based on global positioning system (GPS) coordinates of the small-coverage base station.

27. The non-transitory computer-readable medium of claim 23, wherein, when the code causes the processor to detect whether the operating channel is the same or different than the target channel, the code further causes the processor to monitor the target channel for signals associated with the macrocell.

28. The non-transitory computer-readable medium of claim 23, wherein, when the code causes the processor to detect whether the operating channel is the same or different than the target channel, the code further causes the processor to determine whether a previous location area code of a UE registered with the small-coverage base station is associated with the macrocell.

* * * * *